Dec. 17, 1935.   R. EHRENFELD   2,024,726
DUAL VOLTAGE EXPLOSIONPROOF MOTOR
Filed Dec. 12, 1933   3 Sheets-Sheet 3
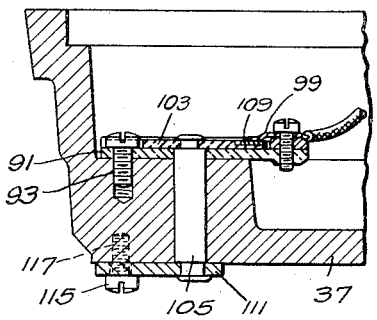
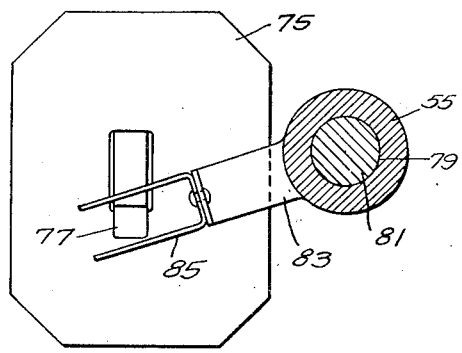
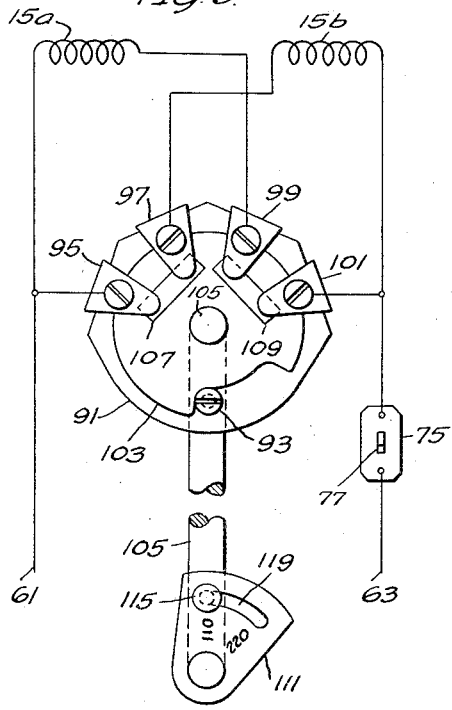
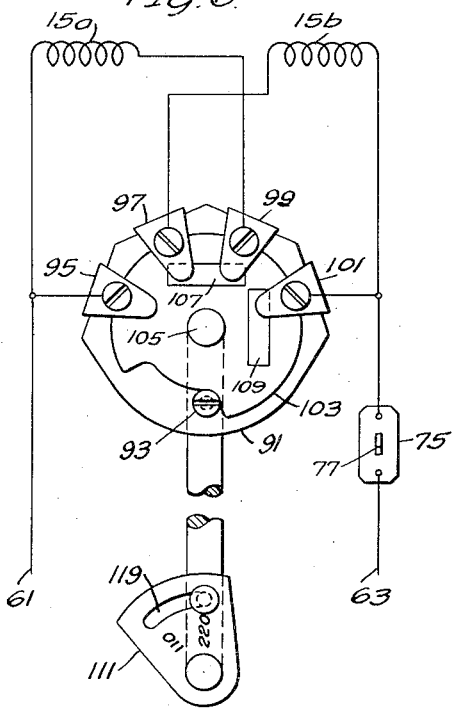
WITNESSES:
INVENTOR
Ralph Ehrenfeld
BY
W. R. Coley
ATTORNEY Patented Dec. 17, 1935

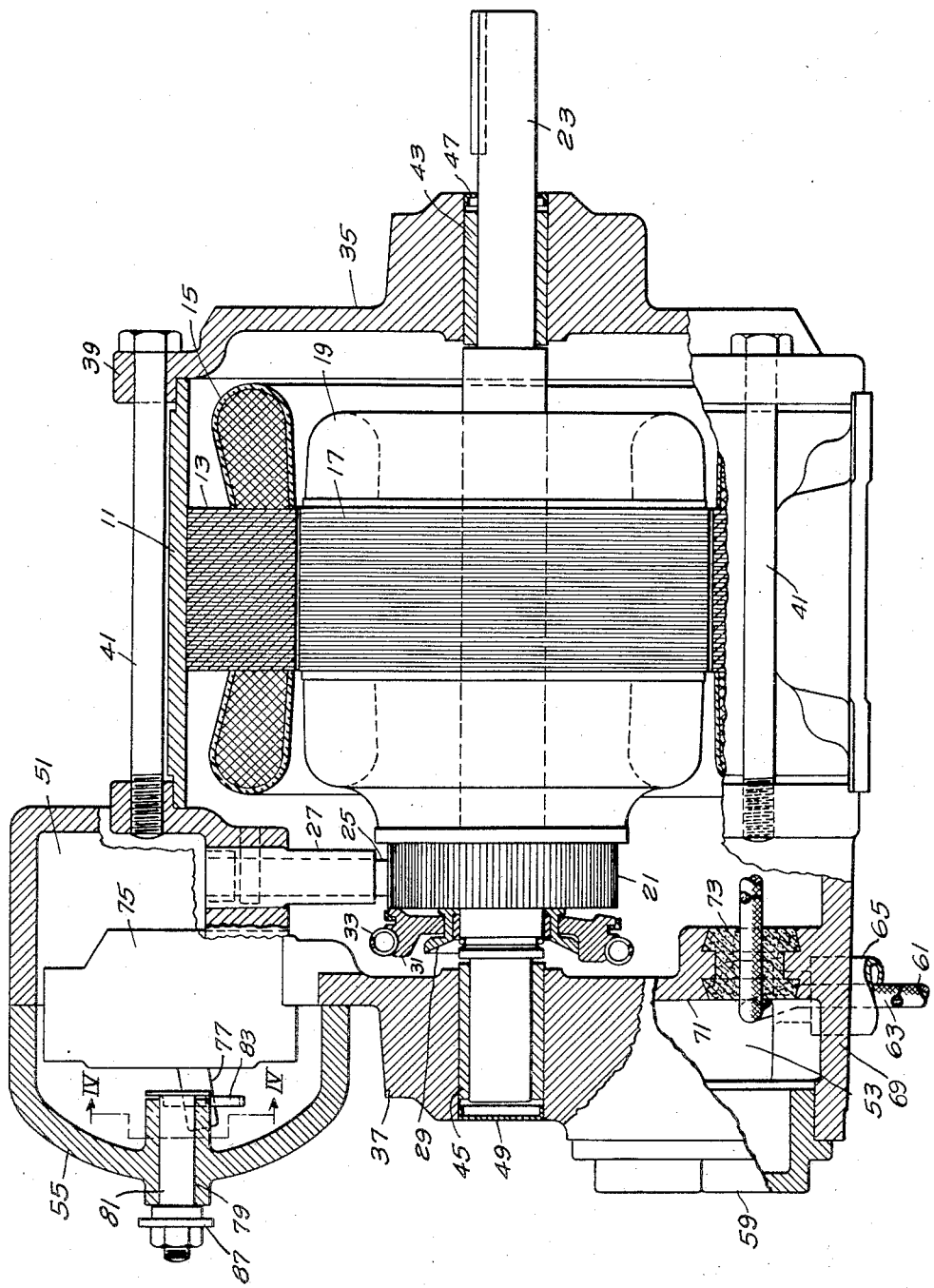

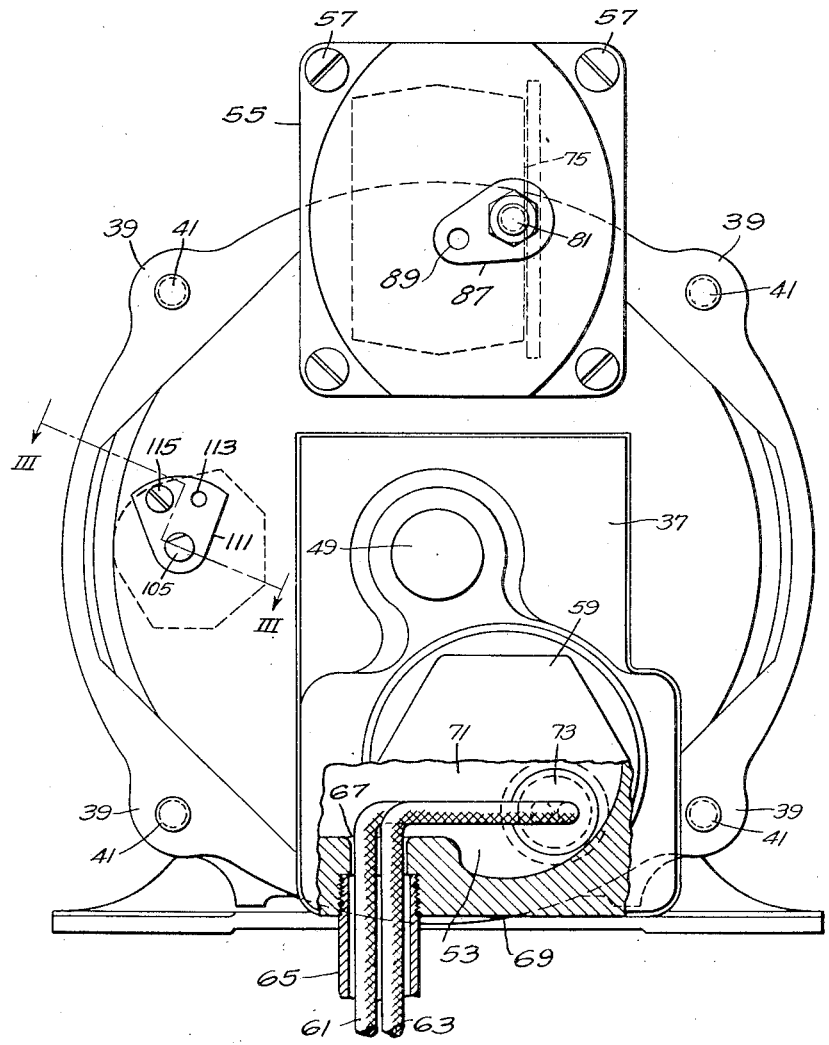

2,024,726

UNITED STATES PATENT OFFICE 2,024,726

DUAL-VOLTAGE EXPLOSIONPROOF MOTOR

Ralph Ehrenfeld, Springfield, Mass., assignor to Westinghouse Electric & Manufacturing Company, East Pittsburgh, Pa., a corporation of Pennsylvania Application December 12, 1933, Serial No. 701,997

4 Claims. (Cl. 172—36)

My invention relates to electric motors and particularly to explosion-proof dual-voltage motors.

An object of my invention is to provide an explosion-proof motor assembly containing within a motor housing a circuit controlling switch and a connection-changing switch for the motor field winding.

Another object of my invention is to provide a relatively simple and efficient change-over switch mounted in an explosion-proof manner within a motor housing to permit the motor to be operated on either one of two different line voltages.

Another object of my invention is to provide a change-over switch the contact members of which are located inside of a motor housing while the actuating and indicating part thereof is located outside of the motor housing and has two limiting operative positions in each of which it can be positively located and held.

Other objects of my invention will either be apparent from the following description or will be pointed out hereinafter.

In practicing my invention I provide a totally enclosed motor, the housing of which is so designed and constructed as to be explosion-proof, and located inside of this housing a switch controlling the energizing circuit of the motor and also a field change-over switch, both of the switches being actuable from the outside of the motor housing.

In the drawings:

Figure 1 is a view in vertical longitudinal section through a motor assembly embodying my invention;

Fig. 2 is a view mainly in end elevation with a small portion broken away, of the structure shown in Fig. 1;

Fig. 3 is a fragmentary sectional view on an enlarged scale taken on the line III—III of Fig. 2;

Fig. 4 is a fragmentary sectional view on an enlarged scale taken on the line IV—IV of Fig. 1; and Figs. 5 and 6 are diagrams of connections of the motor circuit showing more particularly the change-over switch.

A motor casing 11 may be of substantially cylindrical shape and be made either of a casting or of a rolled-up metal plate, and a set 13 of stator laminations is located inside of the casing and held therewithin in any desired manner. An energizing winding 15 is shown in Fig. 1 in its entirety, and it is to be understood that, as this motor is a dual-voltage motor, the energizing or stator winding is made in two sections, shown diagrammatically in Figs. 5 and 6 of the drawings, and there designated by the numerals 15a and 15b respectively.

A rotor structure is rotatably mounted inside of the stator casing 11 and comprises the usual set of rotor laminations 17, a rotor winding 19 and a commutator 21, all assembled in a manner well known in the art, on a rotor shaft 23. The commutator 21 has associated therewith a plurality of brushes 25, only one of which is shown in Fig. 1 of the drawings, it being understood that the proper number of brushes are provided, mounted in brush holders 27, one of which is shown in Fig. 1 of the drawings.

I have illustrated an alternating-current motor of the so-called repulsion-induction type and the rotor shaft 23 has mounted thereon a collar 29 upon which are mounted a plurality of centrifugally-actuable weight members 31, each of substantially T-shape, the inner end portions of the members 31 being located in a recess in collar 29 and the outer ends of the weight members 31 being engaged by a garter spring 33. A device of this kind is well-known in the art and is operative to short circuit the commutator when the rotor has attained to almost its normal operating speed, the position of the commutator short-circuiting device being shown below the axis of the shaft when the rotor is at rest, and being shown in the position occupied during normal running of the motor in the view above the axis of the shaft.

A pulley-end bearing bracket 35 is provided having a bearing therein, and a commutator end-bearing bracket 37 is provided at the other end of the motor casing, these two bearing brackets being severally provided with radially extending portions 39, as shown more particularly in Fig. 2 of the drawings, to provide apertured ears through which a plurality of clamping bolts 41 may extend at one end through bearing bracket 35, while having screw threaded engagement in the other bearing bracket 37.

As is well known in explosion-proof motors, it is necessary not only that all of the housing parts of the motor be relatively strong, but also that any openings of any kind, such as joints between interfitting parts of the motor assembly, shall be so designed and constructed as to present a sufficiently long path between the inside and the outside of the motor, that any flame occurring in the motor will be entirely quenched before it reaches the outside of the motor. To this end the respective bearing brackets 35 and 37 are made relatively heavy and the central bosses thereon for receiving and supporting the respective bearing sleeves 43 and 45 are made relatively long. A dished member 47 is located in the opening in which the bearing sleeve 43 is located, and a somewhat similar dished member 49 is located outside of bearing sleeve 45. These dished members are effective in retaining the oil provided for the bearings; and it is to be noted that while no particular means have been shown in the respective bearings for oiling the same, it is to be understood that any desired means effective for this purpose may be utilized and has not been shown as it constitutes no part of my present invention.

The commutator end bearing bracket 37 is provided with a pair of recesses therein designated respectively by the numerals 51 and 53, both recesses being adapted to be closed by cover members, cover member 55 over recess 51 being adapted to be held in place by a plurality of heavy machine screws 57, as shown in Fig. 2 of the drawings, while cover member 59 over recess 53 is adapted to be screwed into place.

Recess 53 is provided to permit of introducing into the motor structure a pair of conducting leads 61 and 63 which are adapted to be connected to a suitable source of electric energy. The leads 61 and 63 are located in a conduit 65, screwed into the walls of an opening 67 and there extend through a bottom wall 69 surrounding the recess 53. The leads extend through a rear wall 71 back of recess 53 in a somewhat similar manner, that is through a suitable flame-proof seal or gasket 73 which may be of such shape as to be held by reason of its configuration in an opening in wall 71. The seal 73 is preferably made of litharge and glycerin which hardens to form a strong flame resisting mass.

The recess 51 is utilized for the support of a toggle switch 75 provided with an operating handle 77 shown more particularly in Fig. 1 of the drawings. The front wall of cover 55 is provided with a boss extending both in front of and in the rear of wall 55 in order to provide sufficient depth to meet the requirements for an explosion-proof construction. These bosses have an opening 79 therein through which there extends a rod 81 on the inner end of which is fixedly secured so as to turn therewith, an arm 83 at the outer end of which there is mounted a fork 85 of resilient material (see Fig. 4), the two sides of the fork 85 being located, one at each side of toggle arm 77 to actuate the same upon turning movement of shaft 81. At the outer end of shaft 81 there is located an arm 87 having one end secured against the outer end of shaft 81 while its other end may be provided with an opening 89 to receive some kind of an actuating rod. Motors of this general type thus far constructed have been for use in connection with gasoline pumps and are located in an enclosure necessitating some arrangement whereby an operator can effect turning movement, first in one direction and then in the opposite direction, of arm 87 and therefore of shaft 81 and of members 83 and 85 whereby to actuate toggle switch 75 to its open or to its closed position.

As has already been stated hereinbefore, one of the elements of my invention has to do with a change-over switch by which the two parts of the stator winding can be connected, either in parallel for operation on a 110 volt circuit, or in series circuit relation relatively to each other, for operation on a 220-volt circuit. I locate the current-conducting and connection-changing parts of the change-over switch on the inside of bearing bracket 37, in say the left-hand portion of bearing bracket 37 as seen in Fig. 2 of the drawings, although this location is not essential. It is, however, desirable in a motor assembly of this kind that the change-over switch be located within the motor assembly, and this makes necessary the actuation of the same from the outside of the motor.

The change-over switch structure includes a fixed plate 91 of electric-insulating material which may be held against an inner face of bearing bracket 37 provided for that purpose by one or more machine screws 93, only one of which is shown in Fig. 3 of the drawings. Against the outer face of member 91 are mounted four fixed contact members 95, 97, 99 and 101, respectively, (see Figs. 5 and 6), which are connected as shown in Figs. 5 and 6 of the drawings, to the respective terminals of winding sections 15a and 15b, and also to the supply circuit leads 61 and 63, the circuit-controlling switch 75 being also connected in circuit in substantially the manner shown.

A movable disc 103 is fixedly mounted on the inner end of a short shaft 105 to turn therewith, and on the outer face of disc 103 there are mounted in any suitable manner two contact bridging members 107 and 109. When the disc 103 occupies one of its limiting positions, as by the cooperation of one of the screws 93 fitting into a peripheral recess of predetermined arcuate extent, contact bridging member 107 will be engaged by terminals 95 and 97 while bridging member 109 will be engaged by terminals 99 and 101, whereby the two sections 15a and 15b are connected in parallel relation to each other and are therefore adapted for operation on the lower of two operating voltages.

In order to permit of turning movement of disc 103 and shaft 105, I provide a sector plate 111 rigidly secured to the outer end of shaft 105 in any suitable manner, which sector plate may be moved angularly in either one direction or the other through an angle determined by the peripheral extent of the recess in disc 103 shown in Figs. 5 and 6 of the drawings.

As shown in Fig. 2 of the drawings, I may provide the disc 111 with two peripherally spaced openings therethrough, one of which is designated 113, the other being shown as filled by a machine screw 115. Only one opening 117 (see Fig. 3) into the outer surface of bearing bracket 37 is provided, which is screw-threaded to receive the inner end of machine screw 115. Thus, if an operator wishes to change the connections of the two winding portions 15a and 15b relatively to each other, he will unscrew and remove machine screw 115, move sector 111 until the second opening 113 registers with tapped hole 117 and then replace machine screw 115. It is, therefore, obvious that accidental movement of the sector 111 and of the other parts connected therewith is substantially impossible and that the operation of changeover from one position and connection to another requires a plurality of individual steps.

As shown in Figs. 5 and 6 of the drawings, the sector 111 may be provided with an arcuate slot 119, in which case it will not be necessary to remove machine screw 115 but merely to loosen it, after which the sector can be moved from one of its limiting positions to its other limiting position. The machine screw can be re-tightened, and the parts controlled thereby will be held in the position to which they were moved. As shown in Figs. 5 and 6 of the drawings, voltage values may be suitably stamped on the outside surface of disc 111 so that the operator may know by a visual inspection of the outside of the device for what voltage it is connected.

It is obvious that the provision of a stator winding in a motor of this kind comprising two portions which can be connected in series or in parallel with each other and the further provision of a relatively simple change-over switch actuable manually from the outside of the motor assembly makes possible the manufacture of a motor of this kind that can be operated selectively at either of two voltages, it being understood of course that a motor of this kind could be operated on either 220 or 440 volts as well as on either 110 or 220 volts, by proper design, the values of 110 and 220 volts having been mentioned for illustrative purposes only.

The motor structure embodying my invention thus provides an explosion-proof motor assembly having a circuit-controlling switch located on the inside of the motor and actuable from the outside of the motor, as well as comprising a change-over switch to permit an operator to change the connections of the energizing winding sections to adapt the motor to operate on either one of two different supply-circuit voltages, the contact members of the change-over switch being also located on the inside of the motor structure and actuable from the outside thereof.

It will therefore be noted that, by the help of the devices more particularly embodying my invention, I provide a motor which is substantially self-contained insofar as circuit-controlling devices are concerned, two conductors only extending outwardly of the motor to which the usual supply-circuit conductors may be connected. It is obvious that this construction tends to a simplification in the structure and to the use of a minimum amount of space; particularly so, as the change-over switch requires no additional provision as to space and the circuit-controlling switch requires only a relatively small additional space. Inasmuch as it is necessary to make the motor itself in an explosion-proof manner, it is further obvious that if the necessary circuit-controlling devices can be located within the motor housing or structure, a much safer assembly will be obtained than would be the case where the circuit-controlling switches are located in explosion-proof casings auxiliary to the motor itself.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. A dual voltage motor assembly comprising a stator housing, a pair of bearing brackets thereon, a stator, energizing windings thereon, a change-over switch for the energizing windings mounted on the inside of one of the bearing brackets, means extending through the bracket for actuating the switch to one or the other of two operating positions, operating means disposed on the outside of the bracket and cooperating with the switch actuating means, and locking means for the switch operating means on the outside of the bracket and cooperating therewith to limit the movement of the switch and define two limiting positions of the switch.

2. A dual voltage motor assembly comprising a stator housing, a pair of bearing brackets thereon, a stator, energizing windings thereon, a change-over switch for the energizing windings mounted on the inside of one of the bearing brackets, switch-actuating means including a rod extending through the bracket and a plate rigidly secured to the outer end of the rod and having two spaced openings therethrough, and a locking means for the plate extending therethrough and interfitting with the bearing bracket.

3. A dual voltage motor assembly comprising a stator housing, a pair of bearing brackets thereon, a stator, energizing windings thereon, a change-over switch for the energizing windings mounted on the inside of one of the bearing brackets, switch-actuating means including a rod secured at its inner end to one part of the switch and extending through the bracket in an explosion-proof manner, a plate rigidly secured to the outer end of the rod closely adjacent to a part of the outer surface of the bracket and having two spaced openings therethrough, and a single screw adapted to extend selectively through one of said openings and into the bracket at only one point.

4. A dual voltage motor assembly comprising an imperforate stator housing, imperforate bearing brackets one at each end of the housing, a rotor and a stator assembly in the housing, supply circuit conductors extending into the motor assembly through one of the brackets and sealed therein, a circuit-interrupting switch located within the assembly and supported by said one bracket, externally accessible means for actuating the circuit controlling switch, a change-over switch supported by said one bracket on the inside thereof, means including a sector plate located adjacent the outside surface of the bracket for actuating the change-over switch from the outside of the bracket and a locking means for the change-over switch including a bolt extending through the sector plate and interfitting with the bracket.

RALPH EHRENFELD.